US008948817B2

(12) United States Patent
Darwood et al.

(10) Patent No.: US 8,948,817 B2
(45) Date of Patent: Feb. 3, 2015

(54) CELLULAR COMMUNICATION SYSTEM, COMMUNICATION UNIT AND METHOD FOR BROADCAST COMMUNICATION

(75) Inventors: Peter Bruce Darwood, Bristol (GB); Timothy Wilkinson, Bristol (GB)

(73) Assignee: Nvidia Corporation, Santa Clara, CA (US)

( * ) Notice: Subject to any disclaimer, the term of this patent is extended or adjusted under 35 U.S.C. 154(b) by 487 days.

(21) Appl. No.: 11/544,396

(22) Filed: Oct. 5, 2006

(65) Prior Publication Data

US 2008/0085701 A1  Apr. 10, 2008

(51) Int. Cl.
*H04Q 7/20* (2006.01)
*H04B 7/02* (2006.01)
*H04W 72/00* (2009.01)

(52) U.S. Cl.
CPC ............ *H04B 7/022* (2013.01); *H04W 72/005* (2013.01)
USPC ........................................ 455/562.1; 455/445

(58) Field of Classification Search
CPC . H04L 27/2647; H04L 12/189; H04L 1/1867; H04B 7/0667; H04B 7/022; H04W 72/005; H04W 84/047
USPC ............ 455/422.1, 562.1, 445; 370/338, 328, 370/350, 434, 343, 280
See application file for complete search history.

(56) References Cited

U.S. PATENT DOCUMENTS 6,002,716 A * 12/1999 Meyer et al. ................... 375/231
6,370,189 B1 * 4/2002 Morrison et al. ............. 375/224
6,917,597 B1 * 7/2005 Schmidl et al. ............... 370/280
2003/0053413 A1 * 3/2003 Sawahashi et al. ........... 370/208
2004/0240379 A1   12/2004 Tsuie
2005/0281240 A1 * 12/2005 Oh et al. ....................... 370/343
2006/0013186 A1   1/2006 Agrawal et al.
2006/0067206 A1   3/2006 Mantravadi et al.
2006/0088023 A1 * 4/2006 Muller .......................... 370/350
2006/0121905 A1 * 6/2006 McDonald et al. ........... 455/445
2007/0153722 A1 * 7/2007 Gillies et al. ................. 370/328

(Continued)

FOREIGN PATENT DOCUMENTS

CN  1728616 A    1/2006
EP  1 469 646     10/2004
EP  1 605 607     12/2005

(Continued)

OTHER PUBLICATIONS

Holma, H. et al. eds. (2001). *WCDMA for UMTS: Radio Access for Third Generation Mobile Communications*, John Wiley & Sons Ltd.: West Sussex, England, 10 pages (Table of Contents).

(Continued)

*Primary Examiner* — George Eng
*Assistant Examiner* — Jing Gao

(57) ABSTRACT

A wireless serving communication unit comprises a signal processor, for receiving and processing a signal to be broadcast, and a number of transmitters operably coupled to the signal processor, for transmitting the broadcast signal in a plurality of sectorised cells to a wireless subscriber communication unit. The wireless serving communication unit comprises logic to replicate the processed signal into a plurality of replicated signals and logic introduce one or more delay(s) to one or more of the replicated processed signals, such that replicated broadcast signals having different delays are transmitted from a plurality of sectorised cells to one or more wireless subscriber communication unit.

34 Claims, 4 Drawing Sheets

(56) References Cited

U.S. PATENT DOCUMENTS

| | | | |
|---|---|---|---|
| 2007/0160014 A1* | 7/2007 | Larsson | 370/338 |
| 2008/0175221 A1* | 7/2008 | Nakahara et al. | 370/350 |

FOREIGN PATENT DOCUMENTS

| | | |
|---|---|---|
| EP | 1 648 097 | 4/2006 |
| EP | 1 677 460 | 5/2006 |
| JP | 2002094445 A | 3/2002 |

OTHER PUBLICATIONS

Austrailian Patent Application No. 2007304161; Office Action Dated Aug. 24, 2010.

Chinese Application No. 200780037097.1; Office Action Dated: Nov. 30, 2011.

European Patent Application No. 07 820 979.8-2412; Communication Pursuant to Article 94(3) EPC; Dated: Aug. 25, 2010.

Chinese Office Action dated May 11, 2010 from Chinese Patent Application No. 200780037097.1 with translation of same.

Chinese Office Action dated Apr. 13, 2011 from Chinese Patent Application No. 200780037097.1 with translation of same.

International Search Report from PCT/EP2007/060606 dated Feb. 12, 2008.

Communication pursuant to Article 94(3) EPC from European Patent Application No. 07 820 979.8-2412 Dated Nov. 17, 2009.

Translation of Japanese Office Action dated Oct. 25, 2012, Japanese Application No. 2009-530901, 2 pages.

* cited by examiner

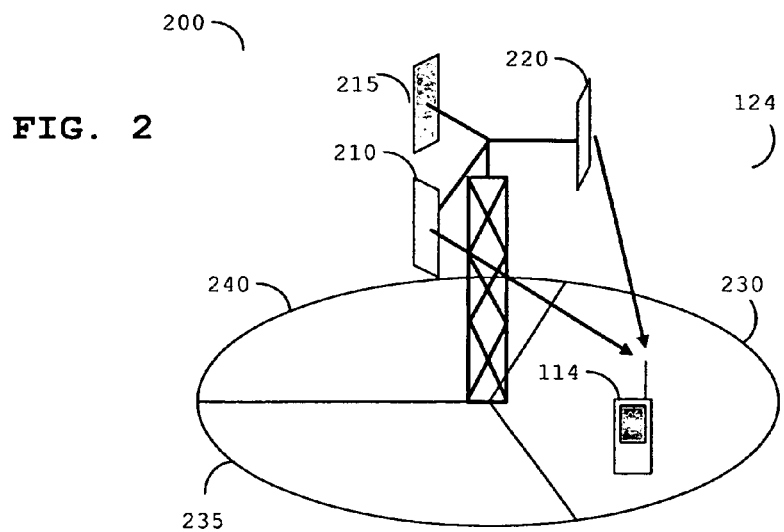
FIG. 2
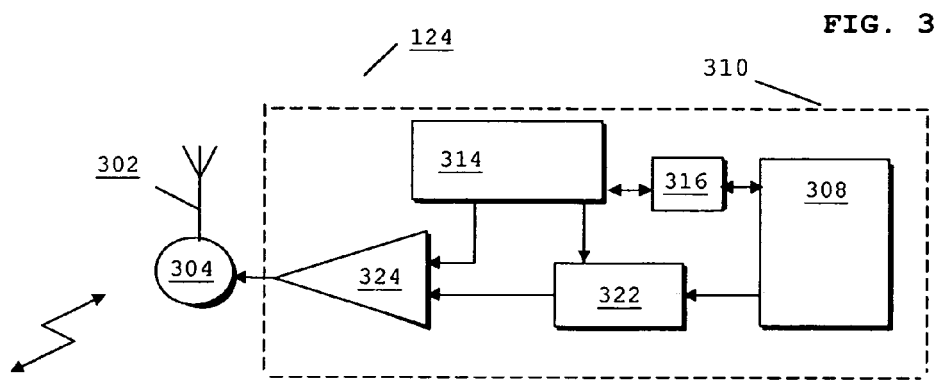
FIG. 3
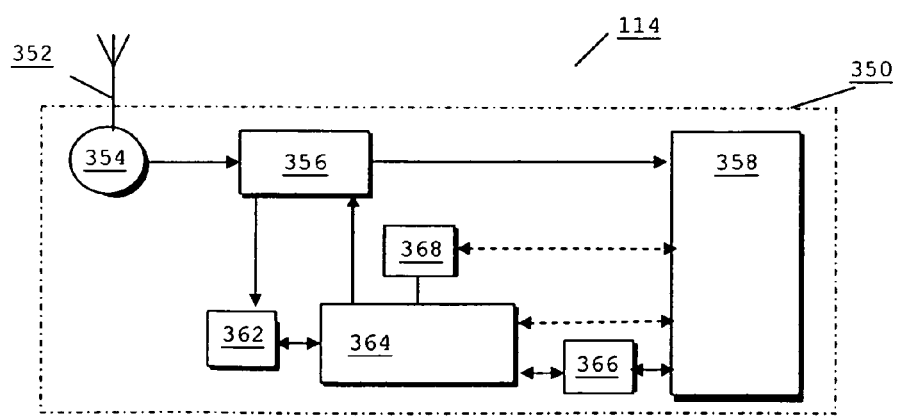

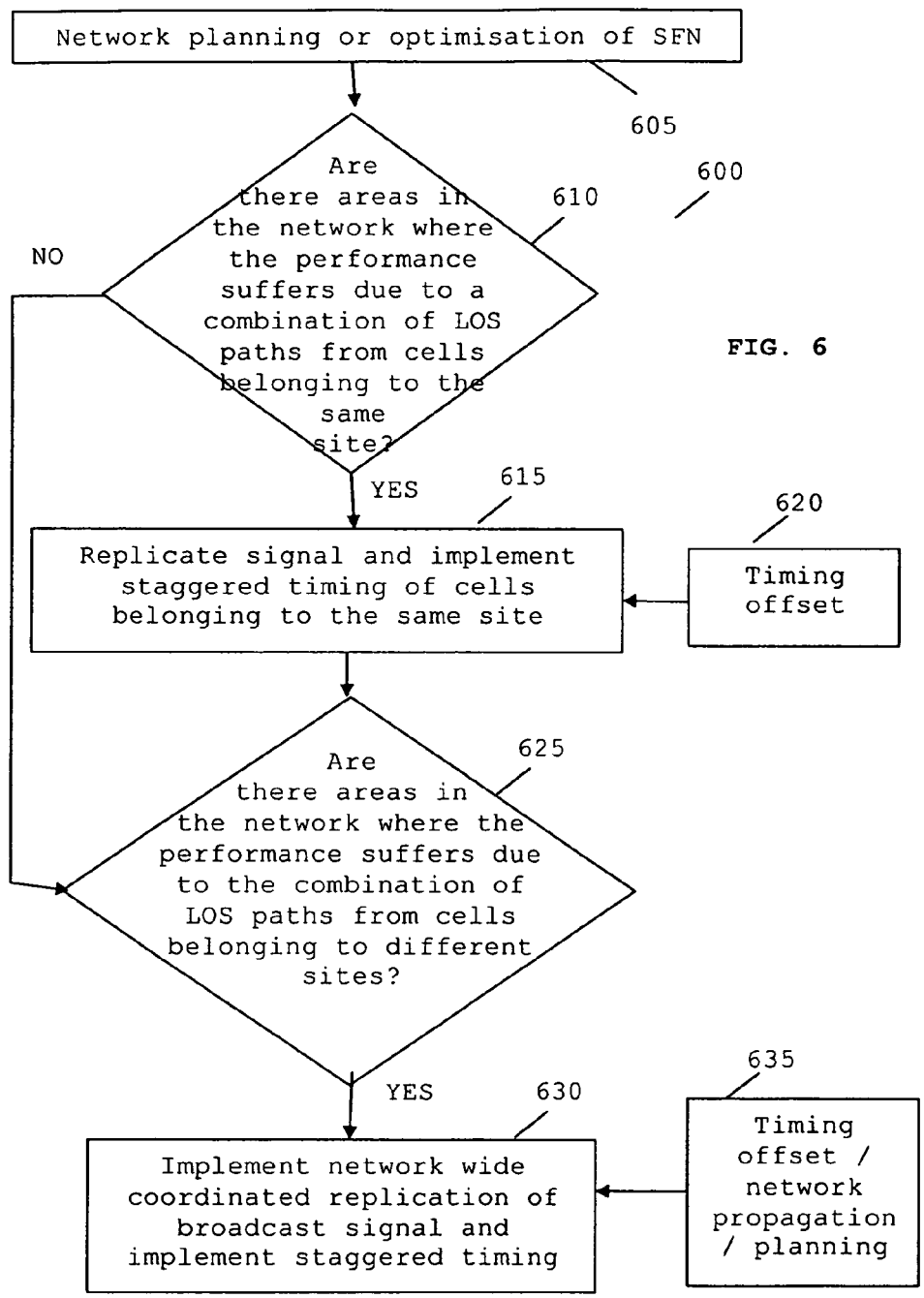

CELLULAR COMMUNICATION SYSTEM, COMMUNICATION UNIT AND METHOD FOR BROADCAST COMMUNICATION

FIELD OF THE INVENTION

The invention relates to utilisation of communication resources in cellular communication systems and in particular, but not exclusively, to supporting broadcast communication in a 3rd Generation Partnership Project (3GPP) cellular communication system.

BACKGROUND OF THE INVENTION

Currently, 3rd generation cellular communication systems are being rolled out to further enhance the communication services provided to mobile phone users. The most widely adopted 3rd generation communication systems are based on Code Division Multiple Access (CDMA) technology. In CDMA systems, user separation is obtained by allocating different spreading and/or scrambling codes to different users operating on the same carrier frequency and using the same time intervals. This is in contrast to time division multiple access (TDMA) systems, where user separation is achieved by assigning different time slots to different users.

An example of a CDMA communication system is the Universal Mobile Telecommunication System (UMTS). Further description of CDMA, and specifically of the Wideband CDMA (WCDMA) mode of UMTS, can be found in 'WCDMA for UMTS', Harri Holma (editor), Antti Toskala (Editor), Wiley & Sons, 2001, ISBN 0471486876.

In a conventional cellular communication system, cells in close proximity to each other are allocated non-overlapping transmission resources. For example, in a CDMA network, cells within close proximity to each other are, despite commonly being allocated the same carrier frequency, allocated distinct spreading codes (to be used in both an uplink communication direction and a downlink communication direction). This may be achieved by, for example, employing the same spreading codes at each cell, but a different cell specific scrambling code. The combination of these leads to effectively distinct spreading codes at each cell.

A technique for increasing the unicast capacity of a cellular network, i.e. the number of simultaneously supportable users, and/or effectively increasing the transmission power is to take an existing cellular base station with an omni-directional coverage region, and split this into a number of independent sectors. In such a situation, each of these new sectors becomes a separate cell, with its own transmitter, a directional antenna and a reduced coverage area. Such a network is referred to as a sectorised cellular network.

In order to provide enhanced communication, the 3rd generation cellular communication systems are designed to support a variety of different and enhanced services. One such enhanced service is multimedia. The demand for multimedia services that can be received via mobile phones and other handheld devices has been growing rapidly over the last few years. However, multimedia services, due to the nature of the data content that is to be communicated, require a high bandwidth.

As radio spectrum is at a premium, spectrally efficient transmission techniques are required in order to provide users with as many broadcast services as possible, thereby providing mobile phone users (subscribers) with the widest choice of services. One such spectrally efficient transmission technique in the provision of multimedia services is to 'broadcast' some multimedia signals, as opposed to sending the multimedia signals in an uni-cast (i.e. point-to-point) manner. With such transmission techniques, typically tens of channels carrying say, news, movies, sports, etc. may be broadcast simultaneously over a communications network.

Broadcast services are conventionally transmitted from a network of transmitters and repeaters (similar to conventional terrestrial Television/Radio transmissions). These transmitters and repeaters typically comprise high antenna masts with omni-directional antennas and high power transmitters. Thus, the coverage area of each transmitter in such a system is typically very large. This scenario encompasses modern digital broadcasting technologies targeted at moving handheld wireless subscriber communication units, such as DVB-H.

Broadcast services may also be carried over cellular networks, although conventionally only unicast user traffic is carried over a cellular network. However, delivering broadcast services over cellular networks is extremely attractive, for at least the following reasons:

(i) It provides a self-contained communication system i.e. the signalling required (e.g. for encryption key exchange) and uplink data (e.g. to support interactive services) can be carried by the same system that is used to deliver the broadcast service.

(ii) It allows a cellular operator to reuse existing infrastructure to provide these new services.

(iii) It allows a cellular operator to use spectrum that they already own.

Technologies for delivering multimedia broadcast services over cellular systems, such as the Mobile Broadcast and Multicast Service (MBMS) for UMTS, have been developed over the past few years. In these broadcast cellular systems, the same broadcast signal is transmitted over non-overlapping physical resources on adjacent cells within a conventional cellular system, for instance using effectively different spreading codes in a CDMA system. Consequently, at the wireless subscriber unit, the receiver must be able to detect the broadcast signal from the cell that it is connected to. Notably, this detection often needs to be made in the presence of additional, potentially interfering broadcast signals, transmitted on the non-overlapping physical resources of adjacent cells.

Enhancements to broadcast transmissions may be achieved by employing what is known as a single frequency network (SFN) approach. Here, the same broadcast signal is transmitted over identical physical resources on adjacent cells of a cellular network. These identical physical resources may include, for example, carrier frequency, CDMA spreading code, timeslot, etc. In this manner, transmissions from adjacent cells of the cellular network are seen as multi-path components of the same signal being received at the receiving unit, instead of potentially interfering signals as described above. Thus, a reduction in interference at the subscriber unit receiver may be observed, by treating the received signals as multi-path components of the same signal, which enables higher data throughput rates to be delivered.

However, the inventors have identified that broadcast transmissions in a synchronised, sectorised cellular network may be suboptimal, for example in a synchronised, sectorised cellular network that employs an SFN approach i.e. where all cells transmit identical signals (SFN) at identical time instants. In this regard, if the cells are identically located (e.g. where a sectorised base station site is used) then received signals from the different sectors are combined in a time-synchronous manner. At a receiving unit the signals from different sectors of the same base site will appear together (at the same time).

Here, multiple non-faded signals with random phase are known to combine to produce a faded signal. Thus, by employing SFN in a synchronous, sectorised broadcast network, there is the potential to turn a previously benign propagation channel (e.g. one that exhibits non-faded channel conditions) into a harsh Rayleigh faded propagation channel. This has a resulting detrimental effect upon the sustainable data throughput rate.

Thus, there exists a need for an improved cellular communication system, communication unit and method of broadcasting that may alleviate one or more of the aforementioned problems.

SUMMARY OF THE INVENTION

Accordingly, the invention seeks to mitigate, alleviate or eliminate one or more of the abovementioned disadvantages singly or in any combination.

According to a first aspect of the invention, there is provided a wireless serving communication unit comprising a signal processor for receiving and processing a signal to be broadcast. The wireless serving communication unit comprises a number of transmitters operably coupled to the signal processor for transmitting the broadcast signal in a plurality of sectorised cells. The wireless serving communication unit comprises logic to replicate the processed signal to form a plurality of replicated signals and logic to introduce one or more delay(s) to one or more of the replicated processed signals, such that replicated broadcast signals having different delays are transmitted from a plurality of sectorised cells.

The invention may allow improved use of the communication resource in the communication system, for example by more effective broadcasting from a single wireless serving communication unit, such as a Node-B. The invention may provide improved performance as perceived by the end-users, for example in the ability to more consistently recover downlink broadcasts. The invention may provide increased throughput rates, for example, due to a more efficient broadcast mechanism that reduces the risk of a wireless subscriber communication unit interpreting multiple time-dispersed copies of the same received broadcast signal as being due to a highly faded channel.

According to an optional feature of the invention, the broadcast transmission may be performed from a plurality of co-located wireless serving communication units. Thus, in this manner, a wireless subscriber communication unit may receive and recover a composite broadcast signal transmit from multiple wireless serving communication units and use standard equalization circuitry to recover the broadcast signal.

According to an optional feature of the invention, the wireless serving communication units may receive a broadcast signal having replicated delayed transmissions from broadcast management logic. In this manner, broadcast transmissions employing such respective delayed transmissions of the replicated signal are broadcast from the wireless serving communication unit.

According to an optional feature of the invention, the wireless serving communication unit may introduce a delay of less than a channel estimation length and/or a delay of less than an equalisation window length into the broadcast transmission. In this manner, the wireless serving communication unit may be able to ensure that the broadcast signal received with multiple respective delays can be recovered by a standard equalization operation of the wireless subscriber communication unit.

According to an optional feature of the invention, if the wireless serving communication unit is configured to use orthogonal frequency division multiplex (OFDM) modulation, the wireless serving communication unit may introduce a delay of less than a cyclic prefix length of an OFDM symbol into the broadcast transmission. In this manner, the wireless serving communication unit may be able to ensure that the broadcast signal received with multiple respective delays can be recovered by a standard equalization operation of the wireless subscriber communication unit.

According to an optional feature of the invention, the wireless serving communication unit may introduce the one or more delay(s) into the broadcast signal to form an asynchronous broadcast transmission. In this manner, the adaptation of synchronous to asynchronous broadcast information may allow the broadcast signal to be more effectively recovered using standard equalization techniques.

According to a second aspect of the invention, there is provided broadcast management logic for a cellular communication system. The broadcast management logic is configured to replicate a broadcast signal. Further, the broadcast management logic is arranged to apply one or more delay(s) to one or more replicated broadcast signals for transmitting to one or more of the plurality of wireless serving communication units.

According to a third aspect of the invention, there is provided a method of broadcasting a signal in a cellular communication system comprising a wireless serving communication unit having a signal processor operably coupled to a number of transmitters. The method comprises processing a broadcast signal; replicating the processed broadcast signal into a plurality of replicated signals; and introducing one or more delay(s) to one or more of the replicated processed signals. The broadcast signal is then transmitted having different delays from a plurality of sectorised cells.

According to a fourth aspect of the invention, there is provided a method of broadcasting a signal in a cellular communication system comprising a wireless serving communication unit having a signal processor operably coupled to a number of transmitters. The method comprises receiving a broadcast signal from management logic wherein the broadcast signal comprises a plurality of replicated signals having one or more delay(s); and transmitting a broadcast signal having different delays from a plurality of sectorised cells.

According to a fifth aspect of the invention, there is provided a computer program product comprising program code for broadcasting a signal in a cellular communication system, comprising a wireless serving communication unit having a signal processor operably coupled to a number of transmitters. The computer program product comprises program code for processing a broadcast signal; replicating the processed broadcast signal into a plurality of replicated signals; introducing one or more delay(s) to one or more of the replicated processed signals; and transmitting a broadcast signal having different delays from a plurality of sectorised cells.

According to a sixth aspect of the invention, there is provided a computer program product comprising program code for broadcasting a signal in a cellular communication system comprising a wireless serving communication unit having a signal processor operably coupled to a number of transmitters. The computer program product comprises program code for receiving a broadcast signal from management logic wherein the broadcast signal comprises a plurality of replicated signals having one or more delay(s); and transmitting a broadcast signal having different delays from a plurality of sectorised cells.

According to a seventh aspect of the invention, there is provided a cellular communication system comprising a wireless serving communication unit having a signal processor for processing a signal to be broadcast and a number of transmitters operably coupled to the signal processor for transmitting a broadcast signal in a plurality of sectorised cells. The wireless serving communication unit comprises logic to replicate the processed signal into a plurality of replicated signals and logic to introduce one or more delay(s) to one or more of the replicated processed signals for transmitting a broadcast signal having different delays from a plurality of sectorised cells.

These and other aspects, features and advantages of the invention will be apparent from, and elucidated with reference to, the embodiment(s) described hereinafter.

BRIEF DESCRIPTION OF THE DRAWINGS

Embodiments of the invention will be described, by way of example only, with reference to the accompanying drawings, in which

FIG. 2 a sectorised base station and associated coverage areas adapted in accordance with some embodiments of the invention;

FIG. 3 illustrates a cellular communication base station communicating with a wireless subscriber communication unit in accordance with some embodiments of the present invention;

FIG. 6 illustrates a flowchart of a broadcast mode of operation in accordance with some embodiments of the present invention.

DETAILED DESCRIPTION OF EMBODIMENTS OF THE INVENTION

The following description focuses on embodiments of the invention applicable to a UMTS (Universal Mobile Telecommunication System) cellular communication system and in particular to a UMTS Terrestrial Radio Access Network (UTRAN) within a 3rd generation partnership project (3GPP) system. However, it will be appreciated that the invention is not limited to this particular cellular communication system, but may be applied to any cellular communication system where broadcast content may be delivered over a sectorised base site.

In summary, an existing sectorised cellular network may be considered for transmission of broadcast signals where the same signal is transmitted from a plurality of antennas, using the same channel frequency, spreading code, data, etc. This is sometimes referred to as transmitting on a single frequency network (SFN), albeit that the transmissions are matched in more than just a same frequency characteristic, as indicated above.

In such a scenario, the inventive concept described herein proposes to adapt existing infrastructure to improve the provision of broadcast services from a single base station/Node-B transmitting the same signal on multiple sectorised cells/sites. Such an improvement is achieved by offsetting (delaying) respective broadcast transmissions of the same signal from a single base station/Node-B when transmitting on multiple sectors/cells, so that the composite broadcast signal received at the wireless subscriber communication unit appears time dispersed and may be equalised in the normal manner, with reduced risk of the multiple cell broadcast transmission appearing as a signal affected by a highly faded channel.

Delivery mechanisms may be made significantly more spectrally efficient by employing a Single Frequency Network (SFN), where the same broadcast signal is transmitted simultaneously from multiple cells within the network. A correctly designed wireless subscriber communication unit, as described with reference to FIG. 3, is then able to combine the signals from the multiplicity of sectors/cells resulting in an increased received signal power and hence higher achievable data rate.

As a consequence of the aforementioned improvement, it is envisaged that in the planning stages of a cellular network for broadcast operation, it may be financially more viable to sectorise each site and have a multiplicity of antennas and transmit power amplifiers rather than have a single higher powered amplifier.

In one embodiment, when employing SFN operation with sectorised sites, it is possible to enhance the system performance by employing modifications to the SFN transmission scheme. These modifications are discussed in greater detail below.

Figure 1:
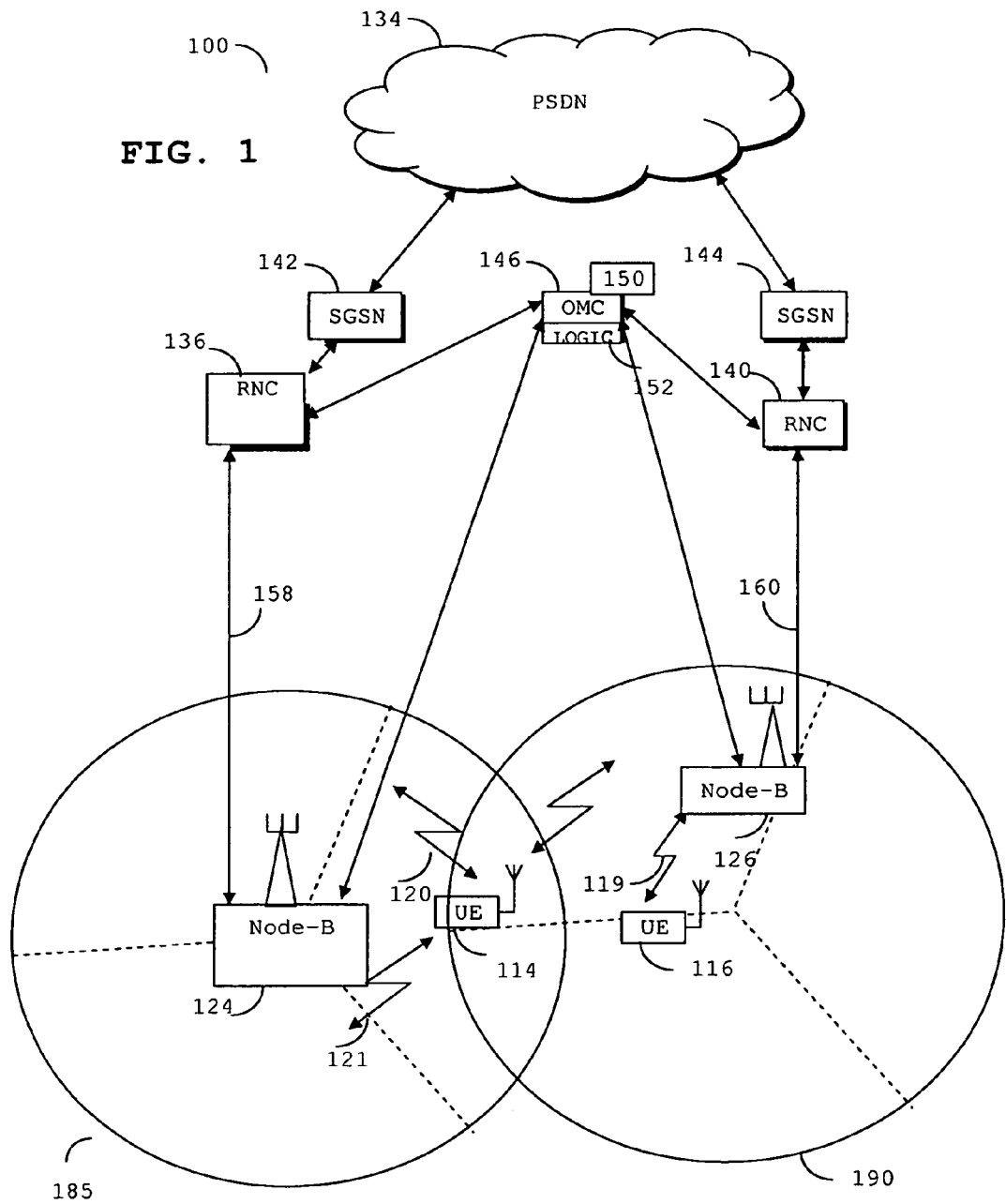
FIG. 1 illustrates a 3GPP cellular communication system adapted in accordance with some embodiments of the present invention.

Referring first to FIG. 1, a cellular-based communication system 100 is shown in outline, in accordance with one embodiment of the present invention. In this embodiment, the cellular-based communication system 100 is compliant with, and contains network elements capable of operating over, a universal mobile telecommunication system (UMTS) air-interface.

A plurality of wireless subscriber communication units (or user equipment (UE) in UMTS nomenclature) 114, 116 communicate over radio links 119, 120, 121 with a plurality of base transceiver stations, referred to under UMTS terminology as Node-Bs, 124, 126. The system may comprise many other UEs and Node-Bs, which for clarity purposes are not shown. Notably, the Node-Bs 124, 126 are illustrated as sectorised Node-Bs, capable of broadcast transmissions of the same signal in a plurality of sectors. Consequently, wireless subscriber communication unit 114 is able to receive a broadcast transmission of the same signal via (at least) two radio links 120, 121 from the single Node-B 124, as well as potentially from Node-B 126.

The wireless communication system, sometimes referred to as a Network Operator's Network Domain, is connected to an external network 134, for example the Internet. The Network Operator's Network Domain includes:

(i) A core network, namely at least one Gateway General Packet Radio System (GPRS) Support Node (GGSN) (not shown) and at least one Serving GPRS Support Nodes (SGSN) 142, 144; and (ii) An access network, namely:
(i) A UMTS Radio network controller (RNC) 136, 140; and
(ii) A UMTS Node-B 124, 126.

The GGSN (not shown), or SGSN 142, 144, is responsible for UMTS interfacing with a Public network, for example a Public Switched Data Network (PSDN) (such as the Internet) 134 or a Public Switched Telephone Network (PSTN). The SGSN 142, 144 performs a routing and tunnelling function for traffic, whilst a GGSN links to external packet networks.

The Node-Bs 124, 126 are connected to external networks, through Radio Network Controller stations (RNC), including the RNCs 136, 140 and mobile switching centres (MSCs), such as SGSN 144. A cellular communication system will typically have a large number of such infrastructure elements where, for clarity purposes, only a limited number are shown in FIG. 1.

Each Node-B 124, 126 contains one or more transceiver units and communicates with the rest of the cell-based system infrastructure via an $I_{ub}$ interface, as defined in the UMTS specification. Node-B 124 supports communication over geographic area 185, whereas Node-B 126 supports communication over geographic area 190.

Each RNC 136, 140 may control one or more Node-Bs 124, 126. Each SGSN 142, 144 provide a gateway to the external network 134. The Operations and Management Centre (OMC) 146 is operably connected to RNCs 136, 140 and Node-Bs 124, 126. The OMC 146 comprises processing functions (not shown) and logic 152 in order to administer and manage sections of the cellular communication system 100.

In accordance with one embodiment of the present invention, the OMC 146 (or equivalent Network Element Manager or controller with similar functionality) has been adapted as described below. Hereafter, this 'central' management entity of the wireless communication system will be referred to as 'management logic'. The management logic 146 communicates with one or more RNCs 136, 140, which in turn provide the signalling 158, 160 to the Node-Bs and to the UEs regarding radio bearer setup, i.e. those physical communication resources that are to be used for broadcast transmissions.

In accordance with one embodiment of the invention, the management logic 146 has been adapted to comprise, or be operably coupled to, broadcast mode logic 150. The broadcast mode logic 150 comprises means for replicating and delaying the same broadcast signal to be sent to one or more wireless subscriber communication units 114, 116 via one or more Node-Bs 124, 126. Alternatively, broadcast mode logic 150 may be configured to instruct the respective wireless serving communication units to implement, respective delayed transmissions of the same signal to be broadcast to the one or more wireless subscriber communication units. In this manner, offset (delayed) respective broadcast transmissions from a number of Node-Bs when transmitting on multiple sectors/cells is performed, so that the composite signal received at the one or more wireless subscriber communication unit may be equalised in the normal manner, with reduced risk of the multiple cell broadcast transmission appearing as a signal affected by a highly faded channel.

It is envisaged that the broadcast mode logic 150 may also be operably coupled to, or located within, other architecture elements within the network, such as RNC 136, 140. It is envisaged that the broadcast mode logic 150 may be distal from the OMC 146 and/or its functionality may be distributed between a number of system elements.

Referring now to FIG. 2, the sectorised nature of a cellular network 200 is illustrated in greater detail. The cells 230, 235, 240 of a sectorised Node B 124 are typically synchronised to each other enabling the use of common circuitry and/or scheduling coordination of communication between the sectors 230, 235, 240. A wireless subscriber communication unit 114 operating within the coverage area of the Node-B 124 will effectively receive signals from each of the cells 230, 235, 240 simultaneously. With conventional uni-cast traffic, typically not all of these signals are intended for the wireless subscriber communication unit 114 and, thus, if all cells transmit with the same carrier frequency then the signals not intended for a particular wireless subscriber communication unit represent interference terms. Although each of the cells may possess a directional antenna 210, 215, 220, it is still typical that a wireless subscriber communication unit 114 in the coverage area of one cell 230 would be able to receive a signal from at least one other sector simultaneously.

In accordance with one embodiment of the invention a single Node-B 124 operating a sectorised site is used to deliver a broadcast signal in a (SFN) manner, where the signal is replicated and one or more delay(s) introduced for transmission of the same signal in multiple sectors. This ensures that identical signals are not transmitted simultaneously from each cell's antenna. Thus, at the wireless subscriber communication unit 114, all signals received are intended for the wireless subscriber communication unit 114 and the interference term may be considerably reduced by employing standard equalisation techniques.

In cluttered environments the broadcast signal received from a cell at the wireless subscriber communication unit 114 will constitute various delayed propagation paths. These are due to the various reflectors and scatterers in the propagation environment. Each of these paths typically fades independently with what is known as a Rayleigh profile as either the wireless subscriber communication unit and/or the reflector/scatterer moves. A wireless subscriber communication unit receiver designed to cope with such propagation environments is able to collect the energy from each of these delayed propagation paths and combine them coherently. This is known as equalisation.

Referring now to FIG. 3, there is shown a block diagram of a Node B 124 communicating with a wireless subscriber communication unit 114 adapted to support the inventive concept of embodiments of the invention.

The Node-B 124 comprises a transceiver incorporating a transmit chain 310 and a receive chain (not shown). The transmit chain 310 comprises a signal processor 308 that receives data from the network, say the management logic 146 of FIG. 1, to be transmitted to one or more wireless subscriber communication unit 114. The signal processor 308 is coupled in series to a transmitter/modulation circuit 322. Thereafter, any transmit signal is passed through a radio frequency (RF) power amplifier 324 to be radiated from the antenna 302. The transmitter/modulation circuit 322 and the power amplifier 324 are operationally responsive to the controller 314, with an output from the power amplifier 324 coupled to a duplex filter or antenna switch 304. The transmitter/modulation circuit 322 comprises frequency up-conversion and frequency down-conversion functions (not shown).

In accordance with embodiments of the invention, the signal processor 308 of the Node-B 124 is arranged to receive signals to be broadcast from the management logic and process these signals. In embodiments of the invention, the signal processor 308 comprises, or is operably coupled to, logic arranged to replicate the processed broadcast signal into a plurality of replicated signals. In addition, the signal processor 308 comprises, or is operably coupled to, logic configured to introduce one or more delay(s) to one or more of the replicated processed signals. The replicated signals are then passed to a single transmitter coupled to respective sector antennas, or passed to respective transmitter chains, in order to transmit a number of delayed broadcast signals in a plurality of sectorised cells.

It is envisaged that in embodiments of the invention that the manner in which the asynchronicity of the broadcast transmission may be introduced by the wireless serving communication unit may be set by the signal processor 308 as one or more of the following: one or more fixed delays, one or more random delays, one or more programmable delays, one or more remotely programmable delays, for example as instructed by broadcast mode logic 152 of FIG. 1.

The wireless subscriber communication unit 114 includes an antenna 352 for receiving multiple broadcast transmissions from the Node-B 124. The wireless subscriber communication unit 114 is coupled to a duplex filter or antenna switch 304 that provides isolation between a receiver chain 350 and a transmitter chain (not shown) within the wireless subscriber unit 114. As known in the art, the receiver chain 350 typically includes receiver front-end circuit 356 (effectively providing reception, filtering and intermediate or baseband frequency conversion) of a plurality of received signals from the transmitting Node-B 124. The receiver front-end circuit 356 comprises frequency up-conversion and frequency down-conversion functions (not shown). The receiver front-end circuit 356 is serially coupled to a signal processing logic (often realised as a digital signal processor (DSP)) 358. The signal processor comprises, or is operably coupled to, equalization logic (not shown) to equalize a time-dispersed received broadcast signal.

The signal processor 358 is coupled to a controller 364 for maintaining overall wireless subscriber unit control. The controller 364 is also coupled to the receiver front-end circuit 356 and memory device 366 for storing operating regimes, such as decoding/encoding functions and the like. A timer 368 is coupled to the controller 364 to control the timing of operations (transmission or reception of time-dependent signals) within the wireless subscriber unit 114.

In accordance with one embodiment of the present invention, the signal processing logic 358 is arranged to receive the plurality of replicated signals via multiple sectors/cells from the wireless serving communication unit at staggered times, based on the one or more delay(s) introduced into the broadcast transmission from Node-B 124. Advantageously, as the plurality of replicated signals from the wireless serving communication unit are received at staggered times, the signal processor 358 is able to process the plurality of replicated signals using standard equalization techniques.

When the wireless subscriber communication unit 114 receives the same broadcast signal transmitted from multiple sectorised cells of a Node-B, each of the signals will typically be faded independently from those of the other cells.

Figure 4:
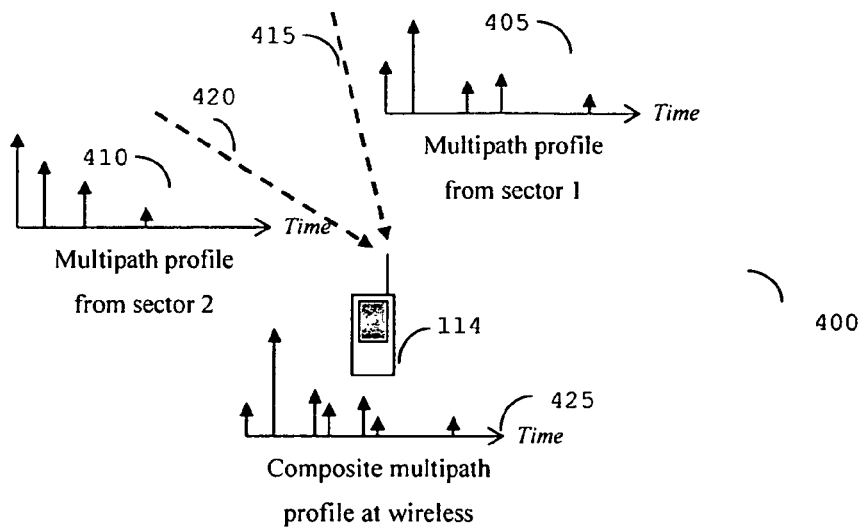
FIG. 4 illustrates multi-path combining in a cluttered environment in accordance with some embodiments of the invention.

At the wireless subscriber communication unit, these delayed versions of the same signal are combined to produce a new composite multi-path delay profile 425 as shown in FIG. 4. Although the time-aligned propagation paths 405, 410, transmitted via respective paths 415, 420 from the different sectors/cells may combine constructively or destructively, it is likely that in such a cluttered environment that the resulting composite multi-path propagation channel has higher signal energy than either of the individual sector's signals. In this regard it is worth noting that the dominant paths from each sector will be time coincident.

Hence, the dominant paths may either combine constructively or destructively. However, there may also be a collection of lesser paths that will not necessarily be time coincident from the two sectors. Hence, the net result will be an instantaneous increase in signal energy. Even when two paths of equal magnitude combine with random phase, their instantaneous energy will fluctuate due to the constructive and destructive nature of their phases when combined, but their long term average energy will be higher than either one of the paths on its own.

However, when the propagation environment is less cluttered there is often a direct line-of-sight (LOS) propagation path that is dominant. This propagation path does not fade, due to the LOS nature of the path. When the wireless subscriber communication unit 114 is in a sectorised broadcast network, with each sector transmitting the same signal, it will typically receive a LOS propagation path from multiple sectors/cells of the same base station. Due to the synchronisation of these sectorised cells the various LOS propagation paths would ordinarily be received at the wireless subscriber communication unit 114 at the same time incident. Hence they would ordinarily be combined together at the wireless subscriber communication unit antenna. However, the phases of these various LOS signals will be random relative to each other (unless the transmissions from each of the sectorised cells are phase locked). Thus, at the wireless subscriber communication unit the LOS signals may have combined constructively or destructively.

Whilst the mean power of the received composite path will be the sum of the powers of the individual LOS components from each of the sectorised cells, instantaneously the power of the received composite path varies as the LOS components combine constructively and destructively. Thus, the fact that the LOS components would have typically arrived time-coincidentally at the wireless subscriber communication unit would have changed an originally benign propagation environment to an effective flat-fading environment. That means that at some points in time the received signals would have combined destructively to such an extent that the composite received path at the wireless subscriber communication unit is too low in power to allow correct demodulation of the transmitted signal. In the cluttered environment this is less critical as there are multiple propagation paths and the probability of them all fading significantly at the same instance in time is considerably reduced. However, in a non-cluttered environment there is a significant risk that two propagation paths may be received and combined destructively. This problem is addressed with the inventive concept described herein.

Thus, in accordance with embodiments of the invention, one or more delay(s) are introduced to replicated transmissions of the same signal from sectorised cells belonging to the same base site, i.e. geographically co-located cells.

Figure 5:
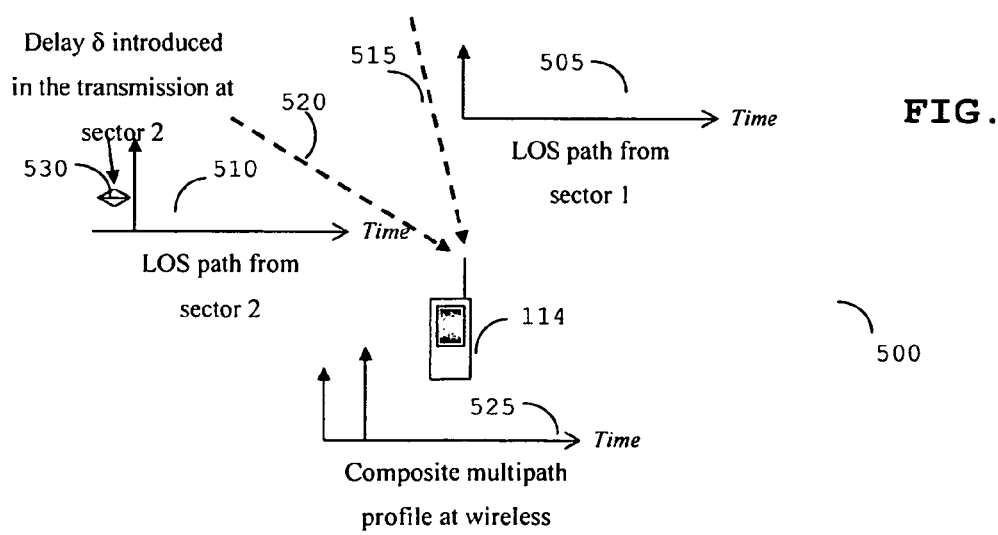
FIG. 5 illustrates a line of sight path combining with sectorised transmission delays in accordance with some embodiments of the invention.

For instance, if a base site is sectorised into, say, three sectors then transmitting the same signal from each or a number of the cells, at different (delayed) points in time, may ensure that a wireless subscriber communication unit 114 receiving signals from more than one of these cells will do so at different time instances. For example, referring now to FIG. 5, broadcast signal 505 from sector-1, transmitted to the wireless subscriber communication unit 114 via communication link 515 and broadcast signal 510 transmitted to the wireless subscriber communication unit 114 from sector-2 via communication link 520 and comprising an introduced delay δ 530. Thus, instead of having a fading composite propagation path at the wireless subscriber communication unit 114, there will be a composite multi-path profile 525 that the receiver of the wireless subscriber communication unit 114 is able to equalise in the normal manner.

In one embodiment of the present invention, the inventive concept may be considered as a sectorised cellular network carrying synchronised broadcast signals in a SFN manner, i.e. the same signal is transmitted from each transmitter in the network, being deliberately made asynchronous at the base site level. Thus, transmissions from individual sectors of a base site are delayed relative to each other in order that a wireless subscriber communication unit is able to receive signals from more than one of these sectors at different instances in time. The wireless subscriber communication unit is then able to equalise the received signal in the normal manner and reduce the probability of the signal being sufficiently faded to disrupt communications.

The length of the delay introduced to the replicated broadcast signals may be designed to be in accordance with what the wireless subscriber communication unit receiver is able to cope with. For instance, in terms of orthogonal frequency division multiplexed (OFDM) modulation the introduced delay may be arranged to be less than the cyclic prefix length of the OFDM symbol. In terms of conventional modulation, such as Gaussian Mean shift keyed modulation employed by a number of cellular communication systems, the introduced delay may be arranged to be less than the channel estimation and equalisation window lengths.

As previously mentioned, in one embodiment, the timing delays may be coordinated on a single intra-site basis or additionally on an inter-site basis at a network level, as illustrated in the flowchart 600 of FIG. 6. The timing delays coordinated on an inter-site basis at a network level may involve a use of a network planning and propagation tool to achieve the best results in optimising a performance of a single frequency cellular communication system, as in step 605.

In the flowchart 600 of FIG. 6, a determination is made, in step 610, to identify whether there are any areas in the cellular communication system where the system performance suffers due to a combination of line-of-sight (LOS) paths from cells belonging to the same site. If areas in the cellular communication system, where the system performance suffers due to a combination of LOS paths from sectors/cells belonging to the same site, are identified in step 610, the method provides for one or more replication of the broadcast signal. The method further proposes that a staggered timing of broadcast signals (by delaying one or more replicated version of the broadcast signal) is generated from each, or a number of, sectors belonging to the same site, as shown in step 615.

Thereafter, in an optional embodiment of the invention, the method determines whether there are any areas in the cellular communication system where the system performance suffers due to a combination of LOS paths from cells belonging to different sites, as shown in step 625. If areas in the cellular communication system exist where the system performance suffers due to a combination of LOS paths from cells belonging to different sites, the method implements a network-wide coordinated staggered timing. For example, broadcast management logic may evaluate the best way to delay replicated broadcast transmissions from a plurality of different sites, when transmitting to a wireless subscriber communication unit. One method of performing this evaluation may be to use network propagation/planning tools, as shown in step 630. In this manner, the method (via the broadcast mode logic) may optimise the timing stagger (delay) between adjacent cells/sectors. To assist in this regard, the network may implement one or more timing offsets, in step 635, by introducing one or more delay(s) in the one or more replicated broadcast signal.

If areas in the cellular communication system do not exist where the system performance suffers due to a combination of LOS paths from cells belonging to different sites, in step 625, then no further time offsets are applied for the respective cells/sectors.

The delays introduced in the transmissions of the same broadcast signal from different cells/sectors of the same base site may be implemented for a number of similar Node-Bs (base sites) in the network. Alternatively, the delays may be introduced in the transmissions of the same signal from different cells/sectors of the same base site in an ad-hoc manner. Thus, the transmission delays may be either base site specific, thereby requiring no network wide coordination, or may be coordinated on a network wide level. This second approach then facilitates a degree of network planning to ensure that any neighbouring cells in the network, be they collocated or not, implement different transmission delays.

It will be appreciated that, for clarity purposes, the above description has described embodiments of the invention with reference to different functional units and processors. However, it will be apparent that any suitable distribution of functionality between different functional units, processors or logic elements, for example with respect to the broadcast mode logic or management logic, may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

Thus, delivering broadcast services over cellular networks, in the manner described above, may provide enhanced performance when the cellular network is sectorised and the broadcast transmission is synchronised using, for example, a single frequency network (SFN).

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality.

We claim:

1. A wireless serving communication unit for a cellular communication system comprising a controller operably coupled to the wireless serving communication unit supporting communication in a plurality of respective communication sites, the wireless serving communication unit comprising:

a signal processor for processing a broadcast signal to be broadcast;

logic to replicate the processed signal to a plurality of replicated processed signals;

a receiver for receiving at least one calculated temporal delay from the controller;

logic to introduce the received at least one temporal delay to at least one of the plurality of replicated processed signals to generate an asynchronous broadcast transmission; and a number of transmitters arranged to transmit the broadcast signal in a plurality of sectorised cells of a communication site, such that multiple replicated and temporally delayed versions of the broadcast signal are transmitted as the asynchronous broadcast transmission from at least one of the plurality of sectorised cells to a wireless subscriber communication unit on at least one from a group consisting of:

a communication inter-site basis; and a cellular communication system basis.

2. The wireless serving communication unit of claim 1 wherein the logic to introduce at least one delay introduces a delay of less than a channel estimation length into the broadcast transmission.

3. The wireless serving communication unit of claim 1 wherein the logic to introduce at least one delay introduces a delay of less than an equalization window length into the broadcast transmission.

4. The wireless serving communication unit of claim 1 wherein the wireless serving communication unit is configured to use orthogonal frequency division multiplex (OFDM) modulation and the logic to introduce at least one delay introduces a delay of less than a cyclic prefix length of an OFDM symbol into the broadcast transmission.

5. The wireless serving communication unit of claim 1 further comprising a receiver operably coupled to the logic to introduce at least one delay, wherein the receiver is arranged to receive a synchronized broadcast signal and the logic to introduce at least one delay introduces the at least one delay to form an asynchronous broadcast transmission.

6. The wireless serving communication unit of claim 1 wherein the logic to introduce at least one delay introduces one or more of the following: fixed delay, random delay, programmable delay, remotely programmable delay.

7. The wireless serving communication unit of claim 1 wherein the wireless serving communication unit is operable in a 3rd Generation Partnership Project (3GPP) cellular communication system.

8. A controller for a cellular communication system wherein the controller is operably coupled to a plurality of wireless serving communication units supporting communication in a plurality of respective communication sites, wherein the controller comprises:

a signal processor for processing a broadcast signal to be broadcast from the plurality of wireless serving communication units;

logic for replicating the broadcast signal to form a plurality of replicated processed signals; and logic to introduce at least one temporal delay to at least one of the plurality of replicated processed signals to generate an asynchronous broadcast transmission for transmitting to the plurality of wireless serving communication units, such that multiple replicated and temporally delayed versions of the broadcast signal are transmitted as the asynchronous broadcast transmission from the plurality of wireless serving communication units to a wireless subscriber communication unit on at least one from a group consisting of:

a communication inter-site basis; and a cellular communication system basis.

9. The controller of claim 8 wherein the controller is an Operations and Management Centre.

10. The controller of claim 8 wherein the logic to introduce at least one delay introduces a delay of less than a channel estimation length into the broadcast transmission.

11. The controller of claim 8 wherein the logic to introduce at least one delay introduces a delay of less than an equalization window length into the broadcast transmission.

12. The controller of claim 8 wherein the controller is configured to use orthogonal frequency division multiplex (OFDM) modulation and the logic to introduce at least one delay introduces a delay of less than a cyclic prefix length of an OFDM symbol into the broadcast transmission.

13. The controller of claim 8 further comprising a receiver operably coupled to the logic to introduce at least one delay, wherein the receiver is arranged to receive a synchronized broadcast signal and the logic to introduce at least one delay introduces the at least one delay to form an asynchronous broadcast transmission.

14. The controller of claim 8 wherein the logic to introduce at least one delay introduces one or more of the following: fixed delay, random delay, programmable delay, remotely programmable delay.

15. The controller of claim 8 wherein the controller is operable in a 3rd Generation Partnership Project (3GPP) cellular communication system.

16. A method of broadcasting a signal in a cellular communication system comprising a controller operably coupled to a plurality of wireless serving communication units supporting communication in a plurality of respective communication sites; the method comprising, when executed at the controller:

processing a broadcast signal to be broadcast from the plurality of wireless serving communication units;

replicating the processed broadcast signal to form a plurality of replicated processed signals;

introducing at least one temporal delay into at least one of the plurality of replicated processed signals to generate an asynchronous broadcast transmission; and transmitting the plurality of replicated processed signals to the plurality of wireless serving communication units, such that multiple replicated and temporally delayed versions of the broadcast signal are transmitted as the asynchronous broadcast transmission from the plurality of wireless serving communication units to a wireless subscriber unit on at least one from a group consisting of:

a communication inter-site basis; and a cellular communication system basis.

17. The method of claim 16 wherein transmitting a broadcast signal from a plurality of sectorised cells comprises transmitting the broadcast signal from a plurality of co-located wireless serving communication units.

18. The method of claim 16 wherein introducing at least one delay comprises introducing a delay of less than a channel estimation length into the broadcast transmission.

19. The method of claim 16 wherein introducing at least one delay comprises introducing a delay of less than an equalization window length into the broadcast transmission.

20. The method of claim 16 wherein introducing at least one delay comprises introducing a delay of less than a cyclic prefix length of an OFDM symbol into the broadcast transmission when the cellular communication system is configured to use orthogonal frequency division multiplex (OFDM) modulation.

21. A method of broadcasting a signal in a cellular communication system comprising a controller operably coupled to a plurality of wireless serving communication units supporting communication in a plurality of respective communication sites; the method comprising at a wireless serving communication unit:

receiving a broadcast signal from the controller;
processing the received broadcast signal;
replicating the processed signal to form a plurality of replicated processed signals;
receiving at least one calculated temporal delay;
applying the received at least one temporal delay to at least one of the plurality of replicated processed signals to generate an asynchronous broadcast transmission; and
transmitting the broadcast signal in a plurality of sectorised cells of a communication site, such that multiple replicated and temporally delayed versions of the broadcast signal are transmitted as the asynchronous broadcast transmission from at least one of the plurality of sectorised cells to a wireless subscriber unit on at least one from a group consisting of:
a communication inter-site basis; and
a cellular communication system basis.

22. A tangible computer program product having executable program code, stored on a non-transitory computer readable medium, for broadcasting a signal in a cellular communication system comprising a controller operably coupled to a plurality of wireless serving communication units supporting communication in a plurality of respective communication sites, the program code operable for, at a wireless serving communication unit:

receiving a broadcast signal from the controller;
processing the received broadcast signal;
replicating the processed signal to form a plurality of replicated processed signals;
receiving at least one calculated temporal delay;
applying the received at least one temporal delay to at least one of the replicated processed signals to generate an asynchronous broadcast transmission; and
transmitting the broadcast signal in a plurality of sectorised cells of a communication site, such that multiple replicated and temporally delayed versions of the broadcast signal are transmitted as the asynchronous transmission from at least one of the plurality of sectorised cells to a wireless subscriber unit on at least one from a group consisting of:
a communication inter-site basis; and
a cellular communication system basis.

23. A tangible computer program product having executable program code, stored on a non-transitory computer readable medium, for broadcasting a signal in a cellular communication system comprising a controller operably coupled to a plurality of wireless serving communication units supporting communication in a plurality of respective communication sites, the program code operable for:

processing a broadcast signal to be broadcast from the plurality of wireless serving communication units;
replicating the broadcast signal to form a plurality of replicated processed signals,
introducing at least one temporal delay to at least one of the plurality of replicated processed signals to generate an asynchronous broadcast transmission;
transmitting the plurality of replicated processed signals to the plurality of wireless serving communication units, such that multiple replicated and temporally delayed versions of the broadcast signal are transmitted as the asynchronous broadcast transmission from the plurality of wireless serving communication units to a wireless subscriber unit on at least one from a group consisting of:
a communication inter-site basis; and
a cellular communication system basis.

24. A cellular communication system comprising:
a controller is operably coupled to a plurality of a wireless serving communication units supporting communication in a plurality of respective communication sites, wherein the controller comprises:
a signal processor for processing a broadcast signal to be broadcast from the plurality of wireless serving communication units;
logic to replicate the processed signal to form a plurality of replicated processed signals;
logic to introduce at least one temporal delay to at least one of the plurality of replicated processed signals to generate an asynchronous broadcast transmission; and
a number of transmitters arranged to transmit the broadcast signal to the plurality of wireless serving communication units, such that multiple replicated and temporally delayed versions of the broadcast signal are transmitted as the asynchronous broadcast transmission from the plurality of wireless serving communication units to a wireless subscriber unit on at least one from a group consisting of:
a communication inter-site basis; and
a cellular communication system basis.

25. The cellular communication system of claim 24 wherein the broadcast transmission is performed from a plurality of co-located wireless serving communication units, such that a composite broadcast signal is received by the wireless subscriber communication unit from the plurality of co-located wireless serving communication units.

26. The cellular communication system of claim 24 wherein the controller introduces a delay of less than a channel estimation length into the broadcast transmission.

27. The cellular communication system of claim 24 wherein the controller introduces a delay of less than an equalization window length into the broadcast transmission.

28. The cellular communication system of claim 24 wherein the cellular communication system is configured to use orthogonal frequency division multiplex (OFDM) modulation and the wireless serving communication unit introduces a delay of less than a cyclic prefix length of an OFDM symbol into the broadcast transmission.

29. The cellular communication system of claim 24 wherein management logic transmits synchronized broadcast signals to the wireless serving communication unit which introduces the at least one delay into the broadcast signal to generate an asynchronous broadcast transmission.

30. The cellular communication system of claim 24 wherein the at least one delay introduced by the wireless serving communication unit comprise(s) one or more of the following: fixed delay, random delay, programmable delay, remotely programmable delay.

31. The cellular communication system of claim 24 wherein the communication system is a 3rd Generation Partnership Project (3GPP) cellular communication system.

32. A controller for a cellular communication system wherein the controller is operably coupled to a plurality of wireless serving communication units supporting communication in a plurality of respective communication sites, wherein the controller comprises:

a signal processor for processing a broadcast signal to be broadcast on an inter-site basis from the plurality of wireless serving communication units;

logic for replicating the broadcast signal to form a plurality of replicated processed signals; and logic for calculating at least one temporal delay that is to be applied to at least one of the plurality of replicated processed signals to generate an asynchronous broadcast transmission;

transmitting the plurality of replicated processed signals to the plurality of wireless serving communication units;

transmitting the calculated at least one temporal delay to the plurality of wireless serving communication units, such that multiple replicated and temporally delayed versions of the broadcast signal are capable of being transmitted as the asynchronous broadcast transmission from the plurality of wireless serving communication units to a wireless subscriber unit on at least one from a group consisting of:

a communication inter-site basis; and a cellular communication system basis.

33. A method of broadcasting a signal in a cellular communication system comprising a controller operably coupled to a plurality of wireless serving communication units supporting communication in a plurality of respective communication sites; the method comprising:

processing a broadcast signal to be broadcast from the plurality of wireless serving communication units;

replicating the broadcast signal to form a plurality of replicated processed signals; and calculating at least one temporal delay that is to be applied to at least one of the plurality of replicated processed signals to generate an asynchronous broadcast transmission;

transmitting the plurality of replicated processed signals to the plurality of wireless serving communication units;

transmitting the calculated at least one temporal delay to the plurality of wireless serving communication units to be applied to a respective one of the plurality of replicated processed signals by a respective one of the plurality of wireless serving communication units, such that multiple replicated and temporally delayed versions of the broadcast signal are capable of being transmitted as the asynchronous broadcast transmission from the plurality of wireless serving communication units to a wireless subscriber unit on at least one from a group consisting of:

a communication inter-site basis; and a cellular communication system basis.

34. A tangible computer program product having executable program code, stored on a non-transitory computer readable medium, for broadcasting a signal in a cellular communication system comprising a controller operably coupled to a plurality of wireless serving communication units supporting communication in a plurality of respective communication sites the program code operable for:

processing a broadcast signal to be broadcast from the plurality of wireless serving communication units;

replicating the broadcast signal to form a plurality of replicated processed signals; and calculating at least one temporal delay that is to be applied to at least one of the plurality of replicated processed signals to generate an asynchronous broadcast transmission;

transmitting the plurality of replicated processed signals to the plurality of wireless serving communication units;

transmitting the calculated at least one temporal delay to the plurality of wireless serving communication units to be applied to a respective one of the plurality of replicated processed signals by a respective one of the plurality of wireless serving communication units, such that multiple replicated and temporally delayed versions of the broadcast signal are capable of being transmitted as the asynchronous broadcast transmission from the plurality of wireless serving communication units to a wireless subscriber unit on at least one from a group consisting of:

a communication inter-site basis; and a cellular communication system basis.

\* \* \* \* \*